United States Patent Office 3,422,089
Patented Jan. 14, 1969

3,422,089
PROCESS FOR THE MANUFACTURE OF CROSS-LINKED GRANULAR STARCH PRODUCTS
Eric M. van Patten, Tinley Park, and Eugene L. Powell, Chicago, Ill., assignors to American Maize Products Company, a corporation of Maine
No Drawing. Filed Nov. 1, 1965, Ser. No. 505,969
U.S. Cl. 260—233.3
Int. Cl. C08b 25/02; A23l 1/04
9 Claims

ABSTRACT OF THE DISCLOSURE

The invention provides a process for the manufacture of modified starch products having exceptional thickening power at room temperatures in which a starch slurry is treated with a reactive chloride in the presence of a small amount of orthophosphate salts of an alkali metal.

---

This invention relates to an improved process for the manufacture of crosslinked granular starch products and more specifically to a thick bodied and high viscosity starch product which may be manufactured at low cost.

A process related to the present invention is described in U.S. Patent No. 2,328,537 granted to Felton and Schopmeyer. In that process an aqueous suspension of starch is treated with a reactive chloride such as phosphorous oxychloride in an alkaline environment having a pH of about 8 to 12. Although the Felton and Schopmeyer starch product has proved to be of commercial value, it has a decided disadvantage. When used in canned and frozen foods the starch does not have sufficient thickening power at the temperature at which the food is sold or served. As a result the food product is watery and a great amount of thickening agent has to be added to the formula in order to improve the consistency and appearance.

It has now been discovered that a modified starch product with acceptable thickening power at room temperatures can be obtained with the Felton and Schopmeyer process by reacting starch and a reactive chloride such as phosphorous oxychloride in the presence of a small amount of orthophosphate salts of an alkali metal. The selected orthophosphate salt must be one which will establish a pH in the reaction mixture at hand of at least 8 and preferably 10 to 12. Examples of such orthophosphate salts are trisodium phosphate, trilithium phosphate and tripotassium phosphates.

No reason has yet been uncovered for any particular mechanism by which the phosphate salt causes the modified starch to increase its thickening power at room temperatures. However, it is certain that the alkaline characteristic of the salt is not the complete answer. The Felton and Schopmeyer process teaches that for best results in obtaining a thick bodied starch the reaction mixture is established at a pH at about 8 to about 12. Yet when an alkaline material other than the orthophosphate salts of the present invention are used to establish the desired pH range for reaction, the final product does not have the thickening power of the product obtained from the present invention.

In defining the characteristics of the modified starch in this invention a Bostwick apparatus is employed. This device which measures the overall visco-elastic behavior of a starch paste, that is the combination of viscosity plus gel formation or structural effects, consists of a steel trough 5 cm. wide and 30 cm. long and varying in depth from 3.8 cm. at the zero end of the scale to 2 cm. at the far end of the scale. The scale on the bottom of the trough is etched and numbered in cms. with a shorter etch marked at each ½ cm. A spring loaded gate with trigger release on the zero end of the scale divides the trough into a short and a long compartment. The short compartment which is 5 cm. by 5 cm. by 3.8 cm. deep is filled level full with the paste to be tested. A leveling bubble and adjuster screws assures that the trough is dead level for the test. At zero time the gate is released so that the paste can flow outward along the scale. After one minute, the distance the leading edge of the paste has advanced is read off as the Bostwick number for that paste.

The Bostwick reading at room temperature for 5% starch paste of the present invention is between about 5 and 7 which is satisfactory for canned and frozen foods. In comparison the modified starch obtained from the Felton and Schopmeyer process gave a Bostwick reading between about 8 and 12.

In forming the novel modified starch of the invention, raw starch granules such as, but not limited to the waxy maize starch, waxy sorghum starch, tapioca, corn starch and wheat starch are suspended in water. The specific gravity of the suspension preferably does not exceed 25° Bé. If the starch granular slurry exceeds 25° Bé., it becomes a puddled cake and can no longer be readily stirred or pumped about. The optimum specific gravity of the starch slurry for reasons of economy and handling was found to be between 12° Bé. and 20° Bé.

A reactive chloride such as described in the Felton and Schopmeyer process is added to the starch slurry. Of the various chlorides, phosphorous oxychloride is best. The amount of reactive chloride to be added to the slurry is about 0.01% to about 0.3% by weight based on the dry weight of starch in the slurry but other concentrations may be employed if desired.

As explained above in order to increase the thickening power of the starch the reaction must be carried out in the presence of small amounts of orthophosphate salts. The quantity of the alkalimetal phosphate salts to be added to the starch slurry depends on the pH of the slurry. It is important in order to obtain the desired results of the invention to maintain a pH of at least 8 and preferably between 10 and 12. Therefore the quantity of salt to be used should be sufficient to raise the pH of the suspension to at least 8.

It has been found that when anhydrous trisodium phosphate salt was used, a range from about 0.7% to 2% by weight based on the dry weight of starch in the slurry resulted in a pH between 10 and 12 respectively.

After the slurry has been prepared the cross linking reaction will take place. However, since at cold or room temperatures the reaction is very slow the slurry is heated preferably to a temperature from about 90° F. to about 120° F., in order to increase the rate of reaction. It has been found that temperatures about 130° F. results in the starch becoming pasty and very difficult to handle.

After the process has proceeded sufficiently to obtain the desired amount of crosslinking in the starch the reaction is stopped by adjusting the pH below 7 preferably between 5 and 6. This is done by adding an acid such as hydrochloric acid to the suspension.

The modified starch is then removed from the slurry by filtration or centrifuge, and washed to remove any excess salt in the product. The modified starch is then dried by conventional means.

Because of the increased thickening power properties of the modified starches obtained by this invention they are useful in canned soups, gravies and spaghetti sauces, frozen pies and prepared dinners where a gravy or white sauce and the like are used.

Further, details of the invention will be illustrated in the following examples which are intended to be illustrative only and not limitations of the invention.

EXAMPLE I

| | Gms. |
|---|---|
| Waxy maize starch (dry basis) | 500 |
| Water | 900 |
| Trisodium phosphate, anhydrous | 6.5 |
| Phosphorous oxychloride | 0.75 |

The starch was mixed in the water to form a slurry having a specific gravity of 20° Bé. Trisodium phosphate was then added to adjust the pH of the slurry to 10.0. The phosphorous oxychloride was then added and the mixture was heated to 110° F. and agitated for 2 hours. The $POCl_3$ starch reaction was killed by acidifying the mixture with an 18% solution of HCl to establish a pH of 5.5. The modified starch was then filtered, resuspended in 1 liter of water, refiltered and dried in an oven at about 180° F. for 17 hours.

A 5% autoclaved paste of the dried sample in water was tested with a Bostwick apparatus and recorded a reading of 5.5 at room temperature.

EXAMPLE II

| | Gms. |
|---|---|
| Waxy sorghum starch (dry basis) | 500 |
| Water | 900 |
| Trilithium phosphate | 4.6 |
| Phosphorous pentachloride | 1.0 |

The method of Example I was repeated except the pH of the slurry was adjusted to 11.8, the temperature of the slurry was 110° F. and the reaction was allowed to proceed for 2 hours.

A 5% autoclaved paste of the dried sample was tested with a Bostwick apparatus and recorded a reading of 5.6.

EXAMPLE III

| | Gms. |
|---|---|
| Waxy maize starch (dry basis) | 500 |
| Water | 900 |
| Tripotassium phosphate | 8.3 |
| Thiophosphoryl chloride | 0.85 |

The starch was mixed in the water to form a slurry having a specific gravity of 20° Bé. Tripotassium phosphate was then added to adjust the pH of the slurry to 10.7. The thiophosphoryl chloride was then added and the mixture was heated to 110° F. and agitated for exactly 2 hours. The $PSCl_3$ starch reaction was killed by acidifying the mixture with an 18% solution of HCl to establish a pH of 5.5. The modified starch was thus filtered, resuspended in 1 liter of water, refiltered and dried in an oven at about 180° F. for 17 hours.

A 5% autoclaved paste of the dried sample in water was tested with a Bostwick apparatus and recorded a reading of 5.5.

EXAMPLE IV

The method of Example I was repeated but the starch was modified with antimony pentachloride and epichlorohydrin in place of the phosphorous oxychloride.

The final products when tested with a Bostwick apparatus recorded a reading of 7.0 and 6.5 respectively.

EXAMPLE V

In this example the method of Example I is repeated using a tapioca starch and adjusting the pH of the slurry with equal amounts of trisodium phosphate and trilithium phosphate. As in Example I the product was satisfactory for use in foods.

It will be understood that the examples are merely intended to give specific illustrations of the way our invention can be carried out and are not intended to imply any limitations on the variations that may be emphasized.

We claim:

1. A process for the production of modified starch granules which consists essentially of the following steps:
   (i) forming an aqueous suspension of raw granule starch particles,
   (ii) adjusting the pH of the slurry to at least 8 by the addition of an alkali metal orthophosphate salt,
   (iii) adding a reactive chloride to the suspension adapted to cross link the starch,
   (iv) allowing the reaction to proceed until sufficient crosslinking of the starch occurs and then making the mixture acidic by the addition of an acid,
   (v) separating the modified starch granules from the aqueous suspension.

2. The process of claim 1 wherein the said phosphorus salt is trisodium phosphate.

3. The process of claim 1 having the additional step of heating the slurry to not over 130° F. to increase the rate of reaction.

4. The process of claim 1 wherein the pH of the slurry is adjusted to about 9 to about 12.

5. In carrying out a reaction of the type in which starch granules in aqueous slurry are reacted with a chloride selected from the group consisting of phosphorus oxychloride, phosphorous pentachloride, thio phosphoryl chloride, antimony pentachloride, antimony oxychloride and epichlorohydrin the improvement which comprises the steps of adding an alkali metal orthophosphate salt to the slurry to establish the pH at a level of at least 8.

6. The process of claim 8 wherein the orthophosphate salt is trisodium phosphate.

7. The process of claim 8 wherein the amount of said salt added to the suspension raises the pH to between about 9 to about 12.

8. A process of modifying starch granules consisting essentially of the following steps:
   (i) forming an aqueous suspension of raw granule starch particles,
   (ii) adjusting the pH of the slurry above 8 by the addition of an alkali metal orthophosphate salt,
   (iii) adding from about .01% to about .3% of a reactive chloride selected from the group consisting of phosphorous oxychloride, phosphorous pentachloride, thio phosphoryl chloride, antimony pentachloride, antimony oxychloride and epichlorohydrin to the suspension,
   (iv) allowing the reaction to proceed until sufficient crosslinking of the starch occurs and then making the mixture acidic by the addition of an acid,
   (v) filtering out the resultant starch reaction product contained in the suspension.

9. Modified starch granules prepared by the process of claim 1, said granules in a 5% paste which has been cooked and autoclaved giving a Bostwick reading between about 5 to about 7.

References Cited

UNITED STATES PATENTS

| 3,278,522 | 10/1966 | Goldstein et al. | 260—233.3 |
| 2,935,510 | 5/1960 | Wurzburg | 260—233.3 |
| 2,853,484 | 9/1958 | Lolkema et al. | |

DONALD E. CZAJA, *Primary Examiner.*

R. W. MULCAHY, *Assistant Examiner.*

U.S. Cl. X.R.

99—124, 139, 144